March 30, 1954 E. J. RIEBE 2,673,429
APPARATUS FOR FORMING AND WRAPPING PRODUCTS
Filed July 26, 1950 7 Sheets-Sheet 1
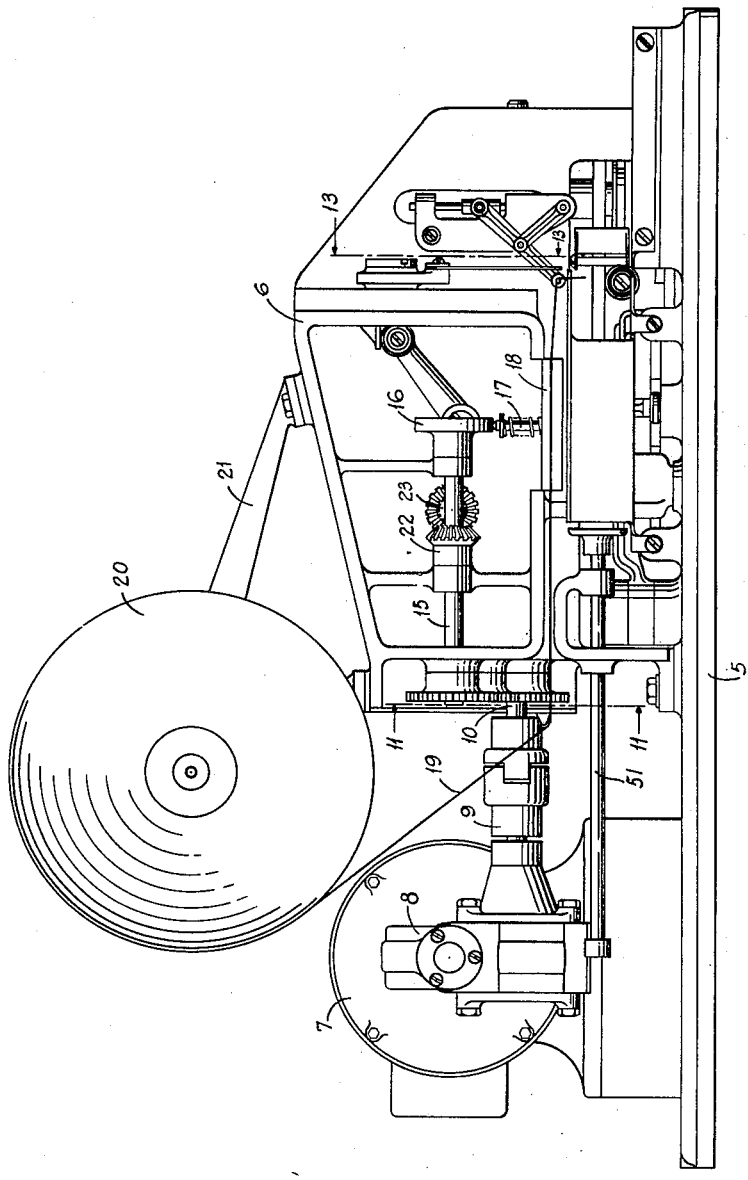
INVENTOR.
EDWARD J. RIEBE
BY

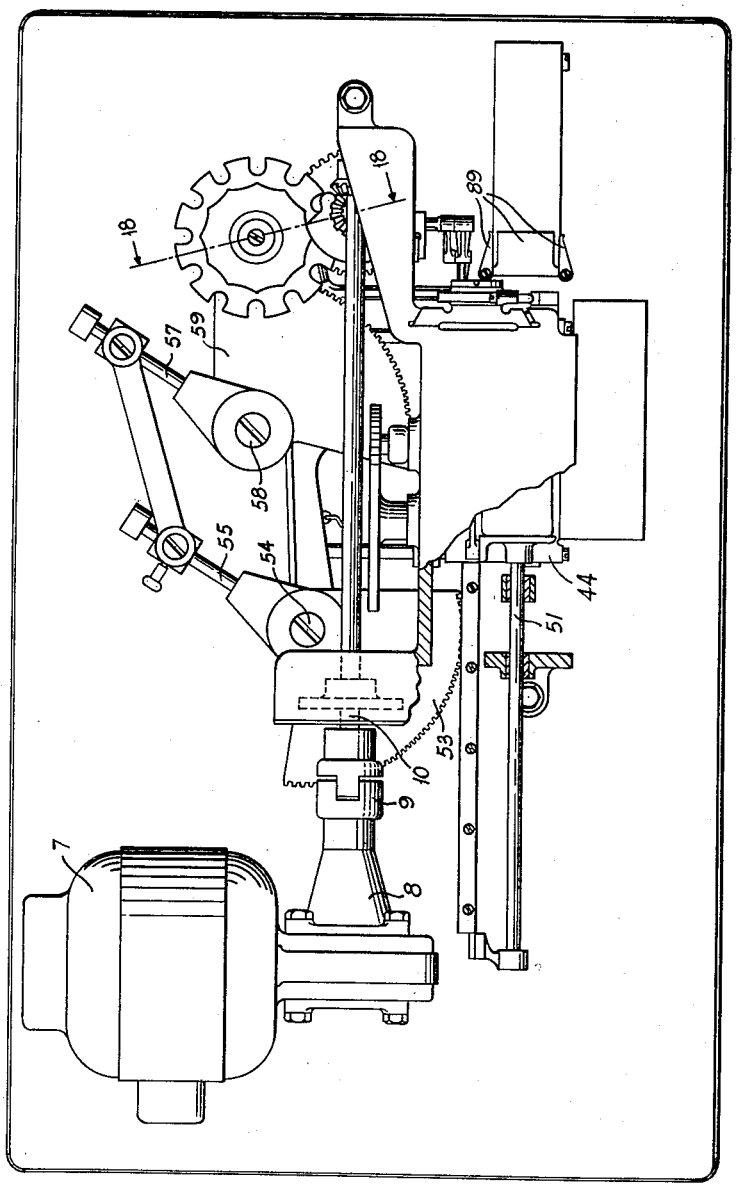

March 30, 1954 E. J. RIEBE 2,673,429
APPARATUS FOR FORMING AND WRAPPING PRODUCTS
Filed July 26, 1950 7 Sheets-Sheet 3
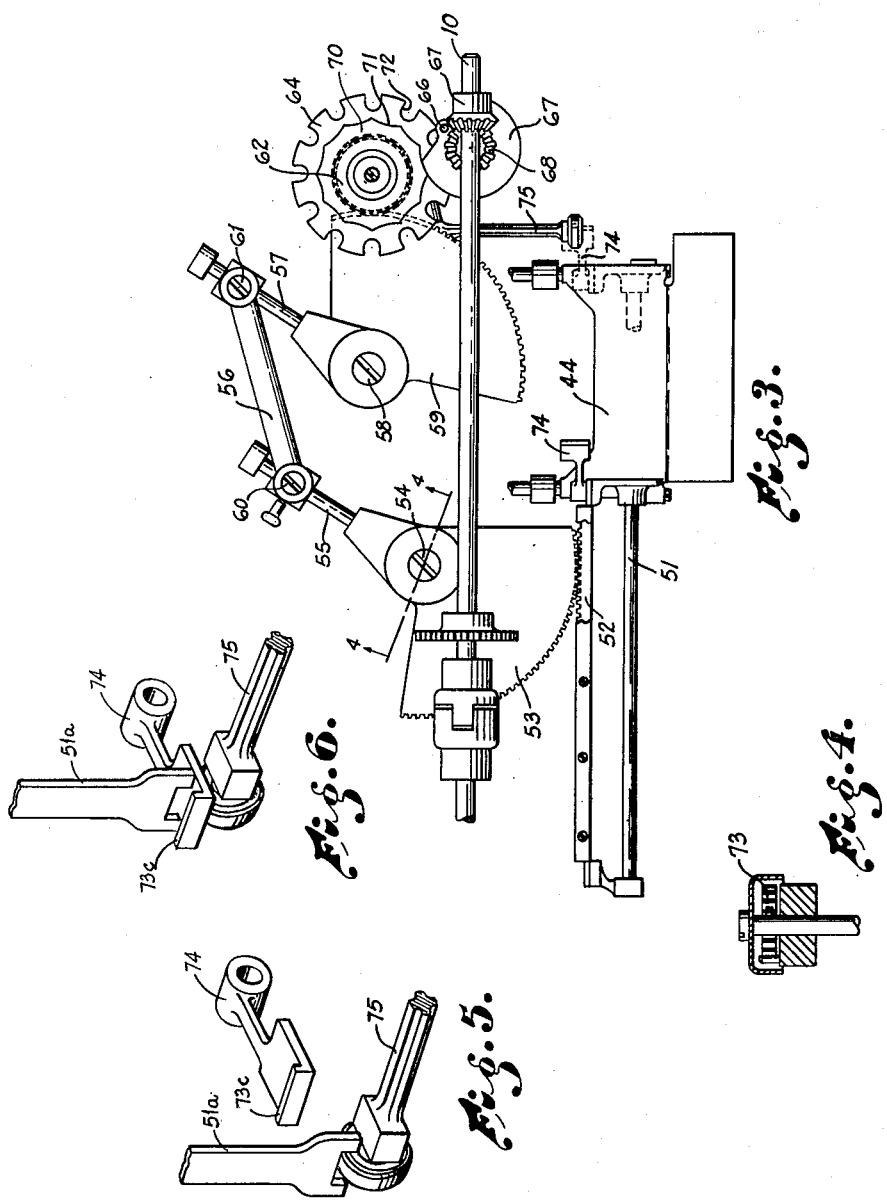
INVENTOR.
EDWARD J. RIEBE
BY March 30, 1954     E. J. RIEBE     2,673,429
APPARATUS FOR FORMING AND WRAPPING PRODUCTS
Filed July 26, 1950     7 Sheets-Sheet 4
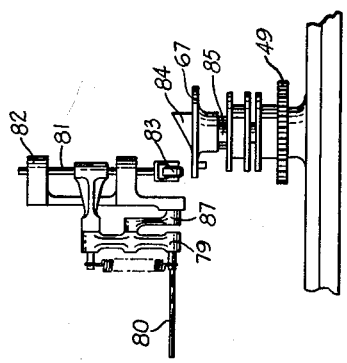
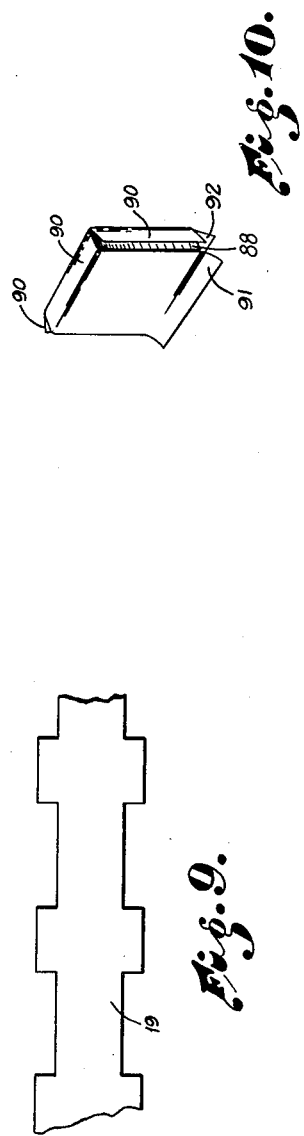
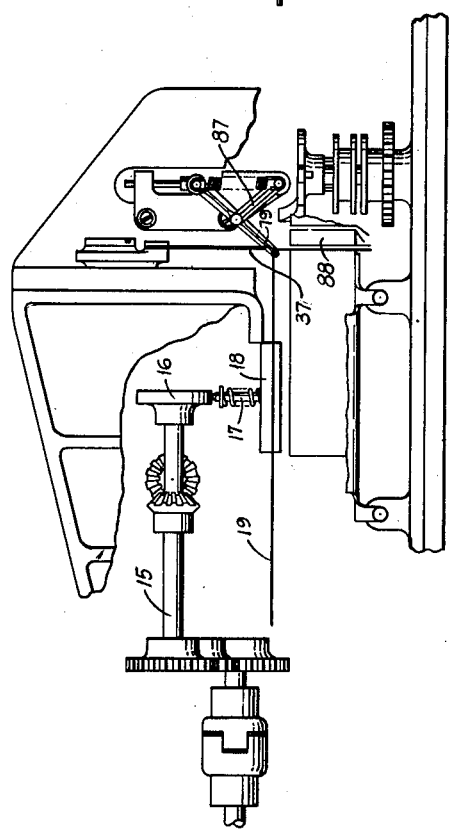
INVENTOR.
*EDWARD J. RIEBE*
BY March 30, 1954  E. J. RIEBE  2,673,429
APPARATUS FOR FORMING AND WRAPPING PRODUCTS
Filed July 26, 1950  7 Sheets-Sheet 5
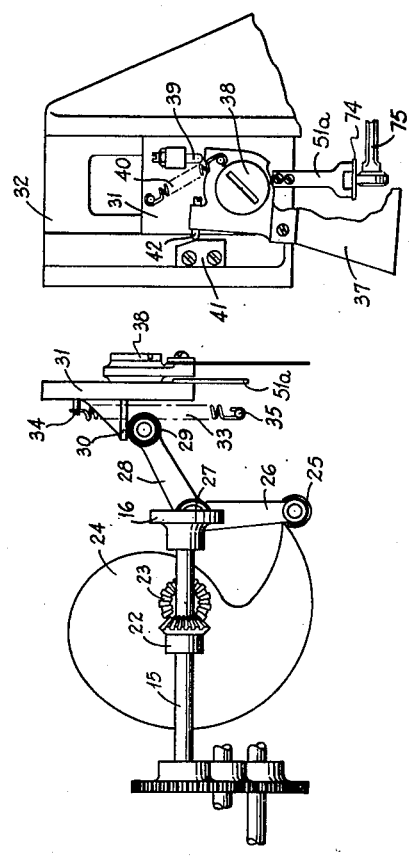
INVENTOR.
EDWARD J. RIEBE
BY
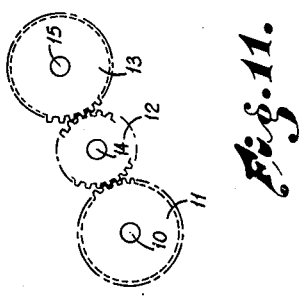

March 30, 1954  E. J. RIEBE  2,673,429
APPARATUS FOR FORMING AND WRAPPING PRODUCTS
Filed July 26, 1950  7 Sheets-Sheet 6

INVENTOR.
EDWARD J. RIEBE
BY

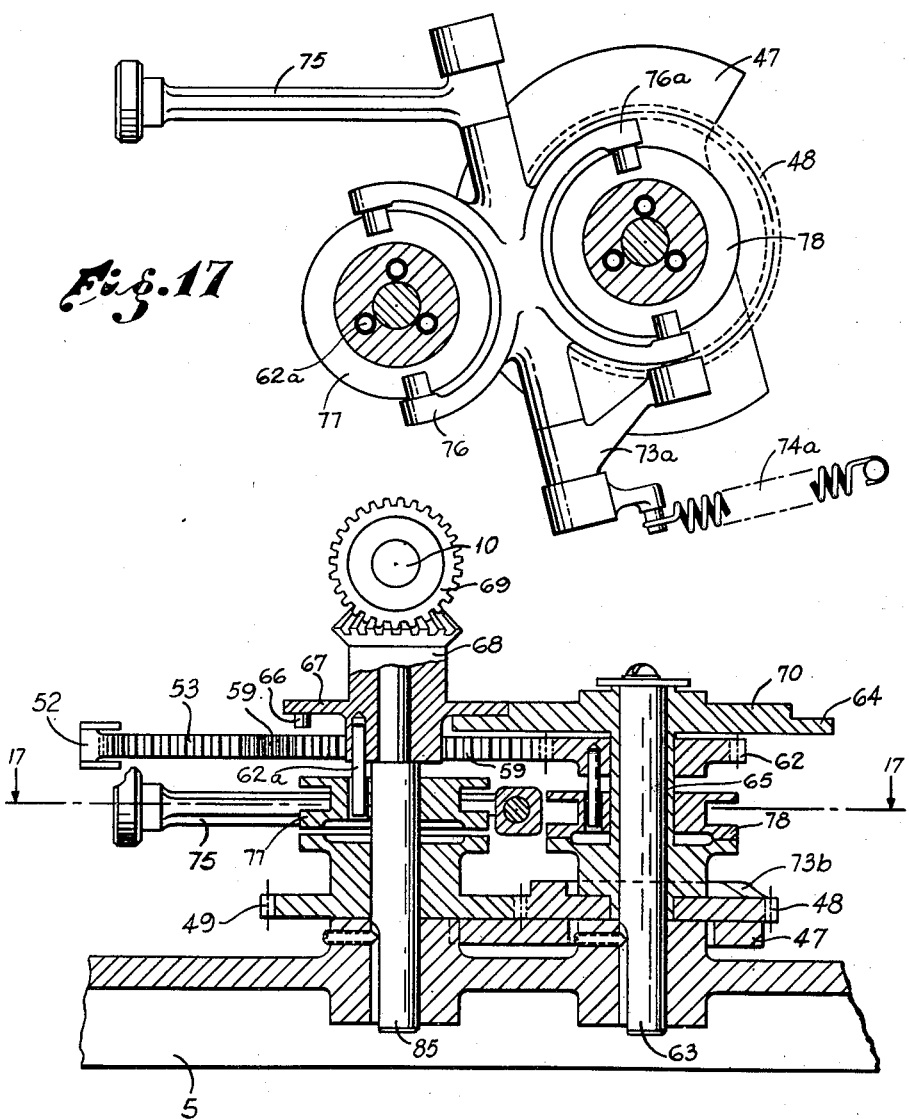

Patented Mar. 30, 1954

2,673,429

UNITED STATES PATENT OFFICE 2,673,429

APPARATUS FOR FORMING AND WRAPPING PRODUCTS

Edward J. Riebe, Hempstead, N. Y.

Application July 26, 1950, Serial No. 175,900

3 Claims. (Cl. 53—56)

This invention relates to an apparatus for forming and wrapping individual portions of materials such as butter, and particularly to a simple and efficient device to cut such products into pats of uniform size and simultaneously to wrap the pats in suitable sheet material.

In restaurants it is customary to serve butter in individual pats. These are usually cut manually from the bars in which form butter is commonly supplied by the manufacturers. This entails much handling, which is unsanitary and is also wasteful because it is difficult to cut the bars uniformly by a manual operation. Furthermore, the pats, when cut, are ordinarily placed in a container with melting ice and are exposed to the atmosphere until used.

It is the object of the present invention to provide a simple and economical machine which will cut pats of butter from a bar and will simultaneously wrap them so that they may be served without contamination due to handling.

Another object of the invention is the provision of a machine which is adjustable to determine the increment of advance of the bar of butter so that pats of predetermined size can be produced.

Other objects and advantages of the invention will be apparent as it is better understood by reference to the following specification and the accompanying drawing, in which Fig. 1 is an elevation of the machine;

Fig. 2 is a plan view thereof;

Fig. 3 is an elevation with parts broken away to illustrate the means for feeding the bar of butter in successive steps;

Fig. 4 is a section on the line 4—4 of Fig. 3;

Figs. 5 and 6 are details in perspective illustrating the means for controlling the mechanism for returning the feeding means to its initial position after a bar of butter has been cut;

Fig. 7 is an elevation of a portion of the machine illustrating the feeding of the wrapping material and the cutting of the butter into pats;

Fig. 8 is an end view of the structure shown in Fig. 7;

Fig. 9 is a plan view of the wrapping material as it is applied to the pats of butter;

Fig. 10 is a view in perspective, showing a pat of butter wrapped in the machine;

Fig. 11 is a section on the line 11—11 of Fig. 1;

Fig. 12 is an elevation of a portion of the machine illustrating the mechanism for operating the cutting knife;

Fig. 13 is an end view of the structure shown in Fig. 12;

Fig. 17 is a section on the line 17—17 of Fig. 18, showing the clutch mechanism which controls the feeding of the bar of butter to the cutting knife and serves to restore the machine to its initial position.

Fig. 18 is a section on the line 18—18 of Fig. 2.

Figure 14:
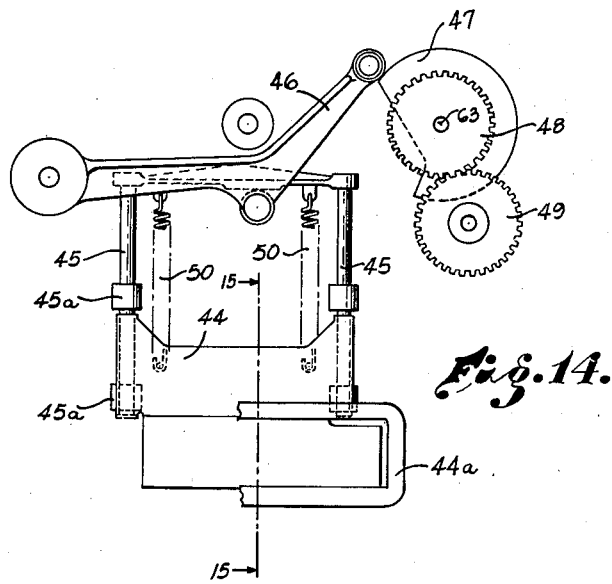
Fig. 14 is a plan view of the means for feeding the bars of butter to the machine from a hopper.
Figure 15:
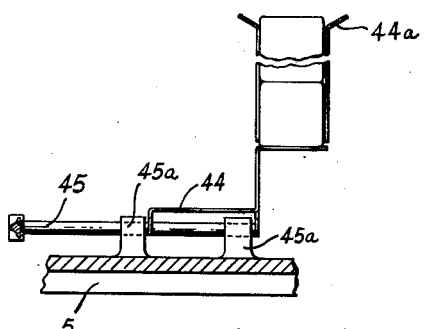
Fig. 15 is a section on the line 15—15 of Fig. 14.

The apparatus as hereinafter described is intended to operate on quarter-pound bars of butter as commonly supplied in the trade. Obviously, by modifying proportions of the machine, it may operate upon bars of any size. Normally the quarter-pound bars are cut into pats ranging between 12, 13, 14, 15, 16, 17 and 18 per quarter-pound, depending upon the size of the desired serving. The present machine may be adjusted to cut from a bar of butter pats of equal size corresponding to the customary practice, or in any desired increment so that any desired number of equal pats may be produced from each bar. Each of the pats is individually wrapped by the machine as the pat is produced.

Referring to the drawing, 5 indicates the base of the machine and 6, a frame attached thereto to support the various operating parts. The machine is actuated by a motor 7, supported on the base, which drives the machine through a speed-reducing gearing 8 and coupling 9. The coupling is connected to a shaft 10 carrying (Fig. 11) a gear 11 which drives gears 12 and 13 on the shafts 14 and 15. The shaft 15, suitably supported in bearings in the frame 6, carries a cam 16, which, at each rotation of the shaft, actuates a plunger 17 connected to a die 18 (Fig. 7) which cuts a strip of wrapping material such as paper 19 to the form indicated in Fig. 9. The paper is fed from a roll 20 (Fig. 1) supported by a bracket 21 on the frame 6.

The shaft 15 carries a bevel gear 22 (Fig. 12) meshing with a bevel gear 23 on a stub shaft supported in the frame 6, which carries a cam 24. The cam is engaged by a roller 25 on one arm 26 of a bell crank lever pivoted at 27 in the frame 6. The other arm 28 of the bell crank lever carries a roller 29 which engages a shoulder 30 of the cutting mechanism. The latter consists of a slidable member 31 traveling in a guide member 32. The shoulder 30 is connected to the slidable member 31 so that, by the action of the cam 24, the slidable member 31 is lifted to its uppermost position, thereby tensioning a spring 33 which is connected at 34 to the slide member and at 35 to the guide member 32 attached to the frame 6. A knife blade 37 is pivotally supported on a screw member 38 on the slidable member 31. The upper edge of the knife blade 37 is normally engaged by an adjustable stop 39, being held in that position by a spring 40 connected to the knife blade 37 and to the slidable member 31. A cam member 41 is secured to the guide member 32 and is adapted to be engaged by an adjustable stop 42 on the knife blade 37 when the latter is released and descends to its lowermost position. Such engagement causes the knife blade 37 to rotate slightly upon its pivot, giving a shearing action which cuts the paper 19 when the knife blade reaches the lower limit of its movement. It will be understood that at each revolution of the cam 24 the knife blade 37 is raised, thereby tensioning the spring 33. At the proper instant, the knife blade 37 is released and descends under the action of the spring 33.

To advance the bar of butter intermittently, in order that the knife blade 37 may descend and cut the desired pats therefrom, a plunger 51 (Figs. 1, 2 and 3) is provided with a rack 52 which meshes with a sector 53 pivoted at 54 and having an arm 55 connected thereto. The arm 55 is connected by a link 56 to a similar arm 57 pivoted at 58 and carrying a gear sector 59. Adjustable connections are provided at 60 and 61. By adjusting the connection 60, the amount of movement of the sector 53 may be adjusted so that the amount of advance of the bar of butter under the action of the plunger 51 may be modified as required. Consequently by this adjustment the size of the pat may be varied within a given range. The adjustment at 61 may be made to correct any variations in the length of the bar of butter.

The sector 59 meshes with a gear 62 (Figs. 3, 18) on a stub shaft 63. This gear is driven through clutch 78 by the wheel 64 of a Geneva motion fastened to the lower half of clutch 78 by means of sleeve 65. Wheel 64 is actuated by a pin 66 on a disc 67 fastened to bevel gear 68 which is driven by bevel gear 69 on shaft 10. The wheel 64 has a member 70 having rests 71 which engage the periphery of the disc 67 when the pin 66 is free from the slots 72 in the periphery of the wheel 64. This locks the mechanism against the action of a spiral spring 73, enclosed in the hub of pivot 54 (Fig. 4) which is wound up as the plunger 51 advances. This spring biases the mechanism to the return position. Thus, at each rotation of the disc 67, the Geneva motion is advanced one step and the sector 59 is moved similarly. The same motion is conveyed through the link 56 to the rack 52 and consequently to the plunger 51. Thus the bar of butter is forced forwardly, step by step, and the knife blade 37 descends at each step to cut a pat of butter from the bar, at the same time inserting a double thickness of paper in the cut.

Figure 16:
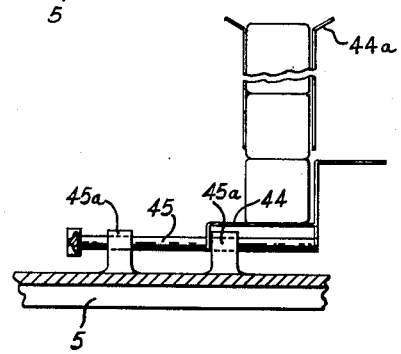
Fig. 16 is a view similar to Fig. 15 showing a different position of the hopper delivery means.

In order to repeat the operation when the bar of butter is exhausted, it is necessary to return the plunger 51 to its original position and allow another bar to be fed onto shelf 44. To allow spiral spring 73 to restore the mechanism to its starting position, this mechanism must be released from the source of power. This is accomplished by a pivoted finger 74 which, as shown in dotted lines in Fig. 3, intercepts, at the end of the final stroke of the plunger 51, a finger 51a (Figs. 5 and 6) rigidly mounted on the slidable member 31, which normally would by-pass an arm 75. The arm 75 is connected to a pair of yokes 76 and 76a (Fig. 17) which are pivoted on the axis of the arm 75 and engage the movable portions of clutch members 77 and 78 (Fig. 18). The movable portions of clutch members 77 and 78 are fixed relatively to disc 67 and gear 62 respectively, but are free to slide up and down on pins 62a. Hence, by depressing arm 75 against spring 74a, clutch 78 is disengaged, releasing gear 62 from the source of power, allowing sectors 53 and 59 to be returned to their initial position by action of spiral spring 73. Thus the plunger 51 is set to be returned to its starting position. Simultaneously with the disengagement of clutch 78, clutch 77 is engaged with its complementary member, starting gear 49, which is fastened to that member, thereby driving gear 48 and cam 47 which are fastened together. Fig. 14 shows cam 47 and associated members in the position just prior to engagement of clutch 77. As the cam 47 starts rotating in a clockwise direction, arm 46 drops off the high point of the cam, allowing shelf 44, which is fixed to bars 45, to move outwardly on bearings 45a under the tension of springs 50, bringing shelf 44 under the hopper 44a, allowing a bar to stop onto the shelf 44, as shown in Fig. 16. The cam 47 continues its rotation engaging arm 46, thereby drawing shelf 44 back to its position against the tension of springs 50 preparatory to advancing the bar through the knife.

If plunger 51 were to be returned too quickly to its initial position, this would allow the arm 75, which is no longer depressed by finger 51a, due to the interception of the pivoted finger 74, to return to its normal position, thereby reversing the clutches before the cycle of supplying a new bar of butter had been completed. To avoid this, finger 74 is latched by means of lugs 73c (Figs. 5 and 6) against plunger 51a delaying the return of plunger 51 until plunger 51a begins to rise, due to the action of cam 24. This delay is of sufficient duration to allow the cam surface 73b (Figs. 17 and 18), part of the gear 48, to rotate itself under arm 73a, holding the clutch 77 until the bar of butter has been brought into position for feeding through the knife. By this time, gear 48 has made one complete revolution, allowing arm 73a to drop off cam surface 73b by action of spring 74a, restoring the clutches to normal, thereby starting a new wrapping cycle.

To feed the strip of paper, the mechanism shown in Figs. 7 and 8 is provided. An arm 79 carries a bar 80 which engages the strip of paper. The arm 79 is a part of a Scott-Russell straight-line mechanism. The arm 79 is connected to a vertically slidable bar 81 supported in a frame 82. The bar 81 carries a roller 83 which is adapted to be engaged by a cam 84, part of disc 67, driven by gear 68 (Fig. 18) from the source of power, i. e., the motor 7. A link 87 is connected to the arm 79 and constrains it to move in a straight line horizontally when the bar 81 is actuated. Thus, as the bar 81 is lifted, the end of the arm and the bar 80 are advanced in a straight line, dragging the strip of paper 19, which has already been cut to the configuration shown in Fig. 9, forwardly in an amount sufficient to provide the necessary slack to avoid sliding of the paper around the knife edge as it cuts through the butter. The bar of butter is then advanced by the desired increment, and the knife blade 37 is released and descends, forcing the strip of paper through the butter and thus forming a wrapped pat 88 as shown in Figs. 7 and 10. When the knife blade 37 reaches substantially its lowermost position, it is given a slight circular motion as hereinbefore indicated, which severs the paper. The wrapped pat of butter is pushed forwardly past spring fingers 89 which fold the flaps 90 (Fig. 10) over the edges of the pat, thus completely covering it. A flap 91 is left free. It may be grasped by the fingers to strip the wrapper from the pat. Flap 92 is folded by the platform on which the pats are conveyed. The pat of butter is thus protected completely from contamination in future handling. The machine, therefore, provides wrapped pats of butter in sanitary form without manual handling.

Various changes may be made in the details of the structure and operation as described without departing from the invention or sacrificing the advantages thereof.

I claim:

1. In an apparatus for forming and individually wrapping portions of materials, the combination of a support for a bar of the material, means for advancing the material in predetermined increments, means for advancing a strip of wrapper, a knife, means actuated to move the knife into engagement with the wrapper against the bar of material to force the wrapper through the bar of material to thereby cut the bar of material, and means actuated to move the knife with an oscillatory motion, after it has cut the bar by forcing the wrapper therethrough, to sever said wrapper.

2. In an apparatus for forming and individually wrapping portions of materials, the combination of a support for a bar of the material, means for advancing the material in predetermined increments, means for advancing a strip of wrapper, a knife, a reciprocally movable slide, means pivotally securing said knife to said slide, means actuated to move said slide toward said bar of material so that the knife engages the wrapper and forces it through the bar of material, thereby cutting said bar of material, and means engaging said pivotally mounted knife after it has forced the wrapper through the bar of material to pivot it about its support, thereby to sever the wrapper.

3. In an apparatus for forming and individually wrapping portions of materials, the combination of a support for a bar of the material, means for advancing the material in predetermined increments, means for advancing a strip of wrapper, a knife, means for moving said knife into engagement with said wrapper against the bar of material to force the wrapper through the bar of material thereby to cut the bar of material and means for further moving said knife after it has forced said wrapper through said bar of material to sever said wrapper.

EDWARD J. RIEBE.

References Cited in the file of this patent

UNITED STATES PATENTS

| Number | Name | Date |
|---|---|---|
| 1,596,514 | Anderson | Aug. 17, 1926 |
| 1,970,183 | Osborn | Aug. 14, 1934 |
| 1,975,936 | Goodwin | Oct. 9, 1934 |
| 2,023,122 | Chandler | Dec. 3, 1935 |
| 2,107,036 | Heineman | Feb. 1, 1938 |
| 2,116,845 | Peck | May 10, 1938 |
| 2,246,016 | Sinclair | June 17, 1941 |
| 2,406,819 | Farrall | Sept. 3, 1946 |
| 2,441,757 | Doering | May 18, 1948 |